(12) United States Patent
Sims

(10) Patent No.: US 8,733,781 B2
(45) Date of Patent: May 27, 2014

(54) TRAILER HITCH SYSTEM AND METHOD

(71) Applicant: Jerry Sims, Happy, TX (US)

(72) Inventor: Jerry Sims, Happy, TX (US)

( * ) Notice: Subject to any disclaimer, the term of this patent is extended or adjusted under 35 U.S.C. 154(b) by 0 days.

(21) Appl. No.: 13/789,670

(22) Filed: Mar. 7, 2013

(65) Prior Publication Data

US 2013/0234414 A1 Sep. 12, 2013

Related U.S. Application Data

(60) Provisional application No. 61/607,692, filed on Mar. 7, 2012.

(51) Int. Cl.
*B60D 1/46* (2006.01)

(52) U.S. Cl.
USPC ......... 280/490.1; 280/511; 280/477; 254/420

(58) Field of Classification Search
USPC ................ 280/490.1, 511, 477; 254/420
See application file for complete search history.

(56) References Cited

U.S. PATENT DOCUMENTS

| | | | | |
|---|---|---|---|---|
| 3,035,856 A | * | 5/1962 | Mleczko et al. | 280/490.1 |
| 3,708,183 A | * | 1/1973 | Jones | 280/483 |
| 3,922,006 A | | 11/1975 | Borges | |
| 4,103,928 A | * | 8/1978 | Sheppard, Jr. | 280/490.1 |
| 5,354,087 A | | 10/1994 | Head | |
| 5,765,850 A | | 6/1998 | Emerson | |
| 5,927,742 A | * | 7/1999 | Draper | 280/477 |
| 6,003,892 A | * | 12/1999 | Henson | 280/504 |
| 6,042,137 A | | 3/2000 | McIntosh | |
| 6,341,795 B1 | | 1/2002 | Zerkel | |
| 6,575,488 B2 | | 6/2003 | Massey | |
| 6,779,616 B1 | | 8/2004 | Brown | |
| D508,221 S | * | 8/2005 | Rebick | D12/162 |
| 7,264,260 B2 | * | 9/2007 | Overstreet | 280/490.1 |
| 7,527,280 B1 | * | 5/2009 | Zachmeier et al. | 280/490.1 |
| 2003/0222426 A1 | * | 12/2003 | Rosenlund | 280/490.1 |
| 2008/0073872 A1 | * | 3/2008 | Scott | 280/477 |
| 2009/0057633 A1 | * | 3/2009 | Beck et al. | 254/420 |

* cited by examiner

*Primary Examiner* — Kevin Hurley
*Assistant Examiner* — Michael Stabley
(74) *Attorney, Agent, or Firm* — Shannon L Warren

(57) ABSTRACT

A trailer hitch is disclosed. Said trailer hitch comprises a first bracket assembly, a second bracket assembly, a coupler assembly, and a jack assembly. Said jack assembly is capable of mechanically adjusting first bracket assembly relative to second bracket assembly. Said coupler assembly is capable of releasably attaching to a hitch on a vehicle.

12 Claims, 11 Drawing Sheets

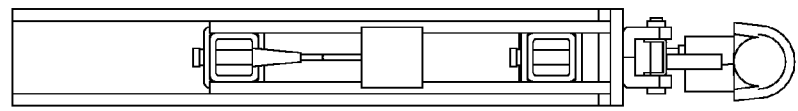
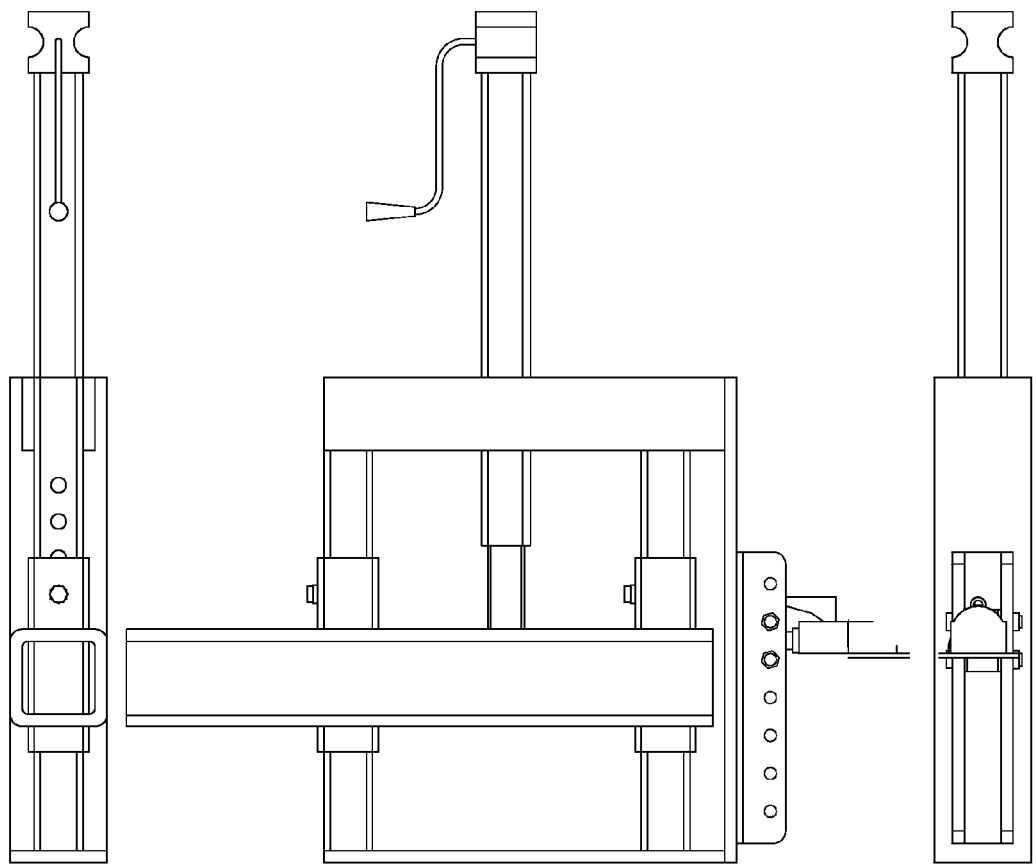
Fig. 2B
Fig. 2C          Fig. 2D   Fig. 2E

TRAILER HITCH SYSTEM AND METHOD

This disclosure relates generally to a system and method for adjusting a trailer hitch system. Further, it claims priority to provisional patent application No. 61/607,692.

BACKGROUND

Said trailer hitch systems can be used as an addition to or as a part of a trailer for adjusting the height and leverage of said trailer while attached to a vehicle. Previous systems for adjusting said trailer hitch systems comprise rudimentary approaches such as unloading and reloading said trailer or removing said trailer from said vehicle to make adjustments.

None of the above inventions and patents, taken either singularly or in combination, is seen to describe the instant disclosure as claimed. Accordingly, an improved system and method for adjusting a trailer hitch system would be advantageous.

SUMMARY

A trailer hitch system and method are disclosed. Said trailer hitch system comprises a first bracket assembly, a second bracket assembly, a coupler assembly, and a jack assembly. Said jack assembly is capable of mechanically adjusting first bracket assembly relative to second bracket assembly. Said coupler assembly is capable of releasably attaching to a hitch on a vehicle.

Said method of using a trailer hitch comprising: adjustably attaching a first bracket assembly to a second bracket assembly, moving said first bracket assembly in a vertical direction relative to said second bracket assembly, and releasably attaching a coupler assembly to a hitch on a vehicle. Said trailer hitch comprises said first bracket assembly, said second bracket assembly and said coupler assembly.

BRIEF DESCRIPTION OF THE DRAWINGS

FIGS. 2A, 2B, 2C, 2D, and 2E illustrate a back perspective overview, top view, back view, side view, and front view, respectively, of trailer hitch.

DETAILED DESCRIPTION

Described herein is a system and method for adjusting a trailer hitch system. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
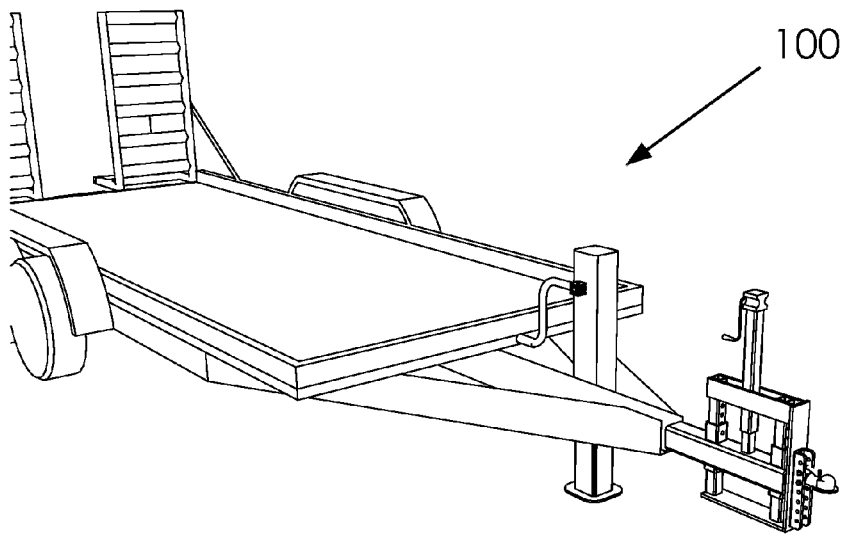
FIGS. 1A and 1B illustrate a perspective overview and an elevated front view of a trailer having a trailer hitch.
Figure 1B:
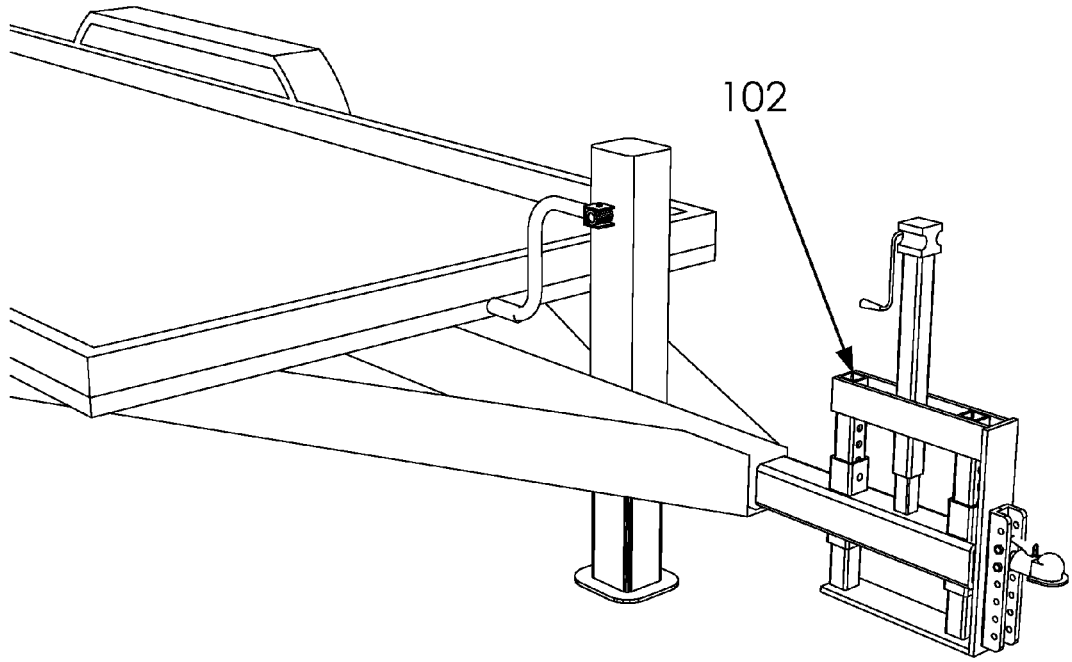
Figure 2A:
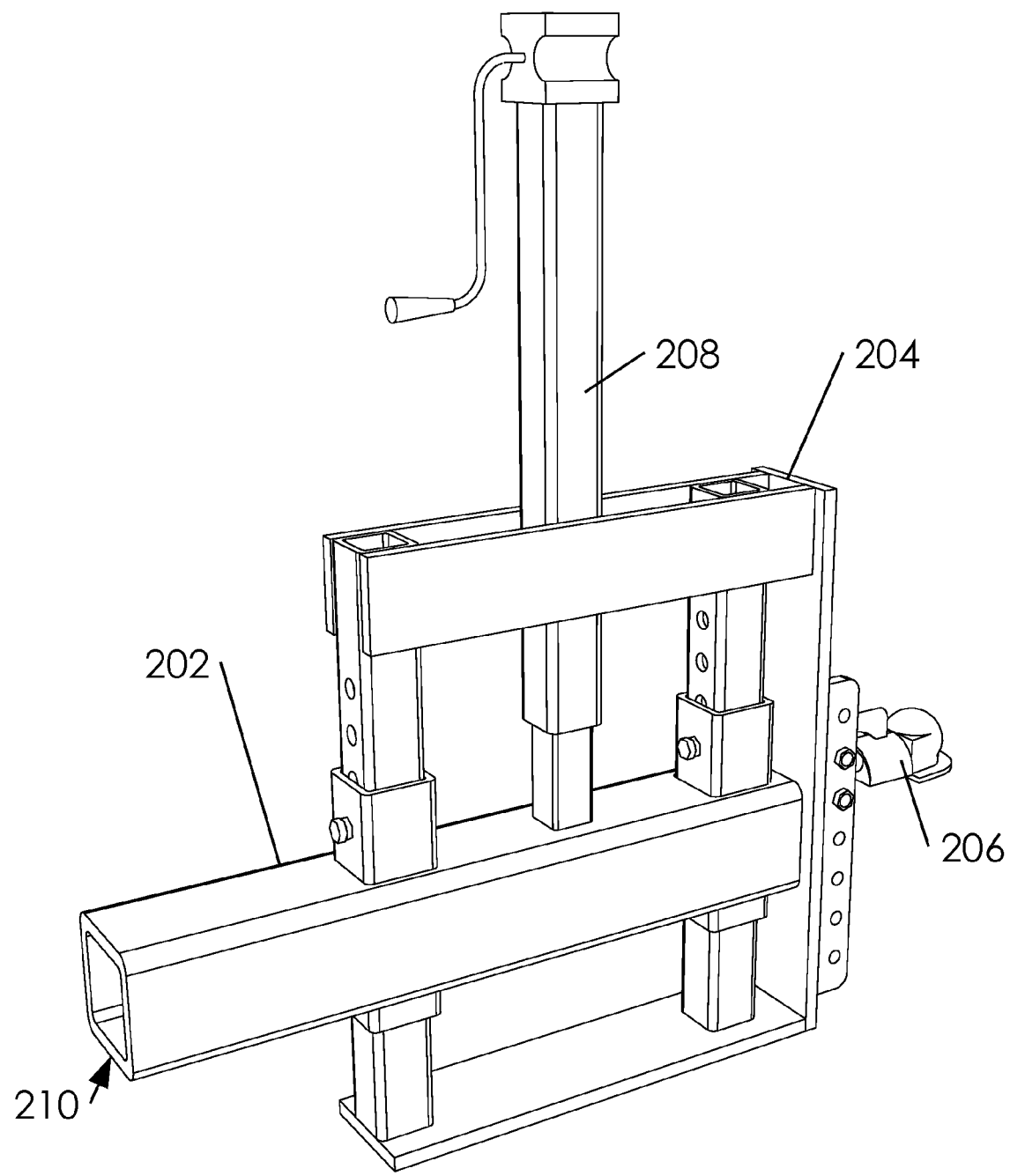

FIGS. 1A and 1B illustrate a perspective overview and a perspective detailed view of a trailer 100 having a trailer hitch 102. In one embodiment, trailer hitch 102 can attach to trailer 100 or comprise a component of trailer 100. In one embodiment, trailer hitch 102 can be used for adjusting the height of trailer 100 without detaching trailer 100 from a vehicle or adjusting the trailer height to maintain proper leverage. In one embodiment, trailer 100 with trailer hitch 102 can be useful for private uses as well as within agricultural, industrial, and construction industries.

FIGS. 2A, 2B, 2C, 2D, and 2E illustrate a perspective overview, an elevated top view, an elevated back view, an elevated side view, and an elevated front view, respectively, of said trailer hitch 102. In one embodiment, said trailer hitch 102 can comprise a first bracket assembly 202, a second bracket assembly 204, a coupler assembly 206, and a jack assembly 208. In one embodiment, an end portion 210 can attach to said trailer 100.

Figure 3A:
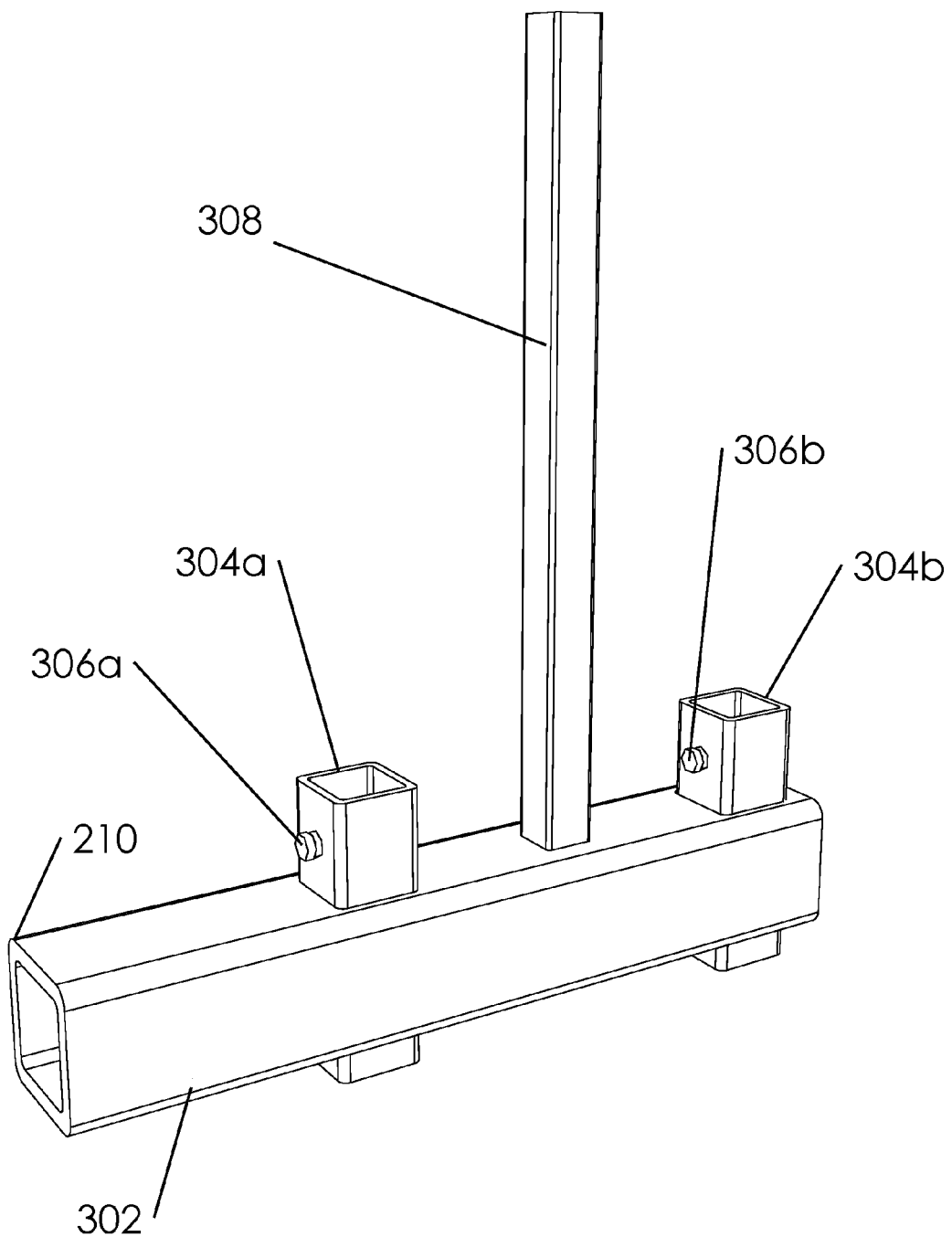
FIGS. 3A, 3B, and 3C illustrate a series of back perspective overviews illustrating the portions of trailer hitch.
Figure 3B:
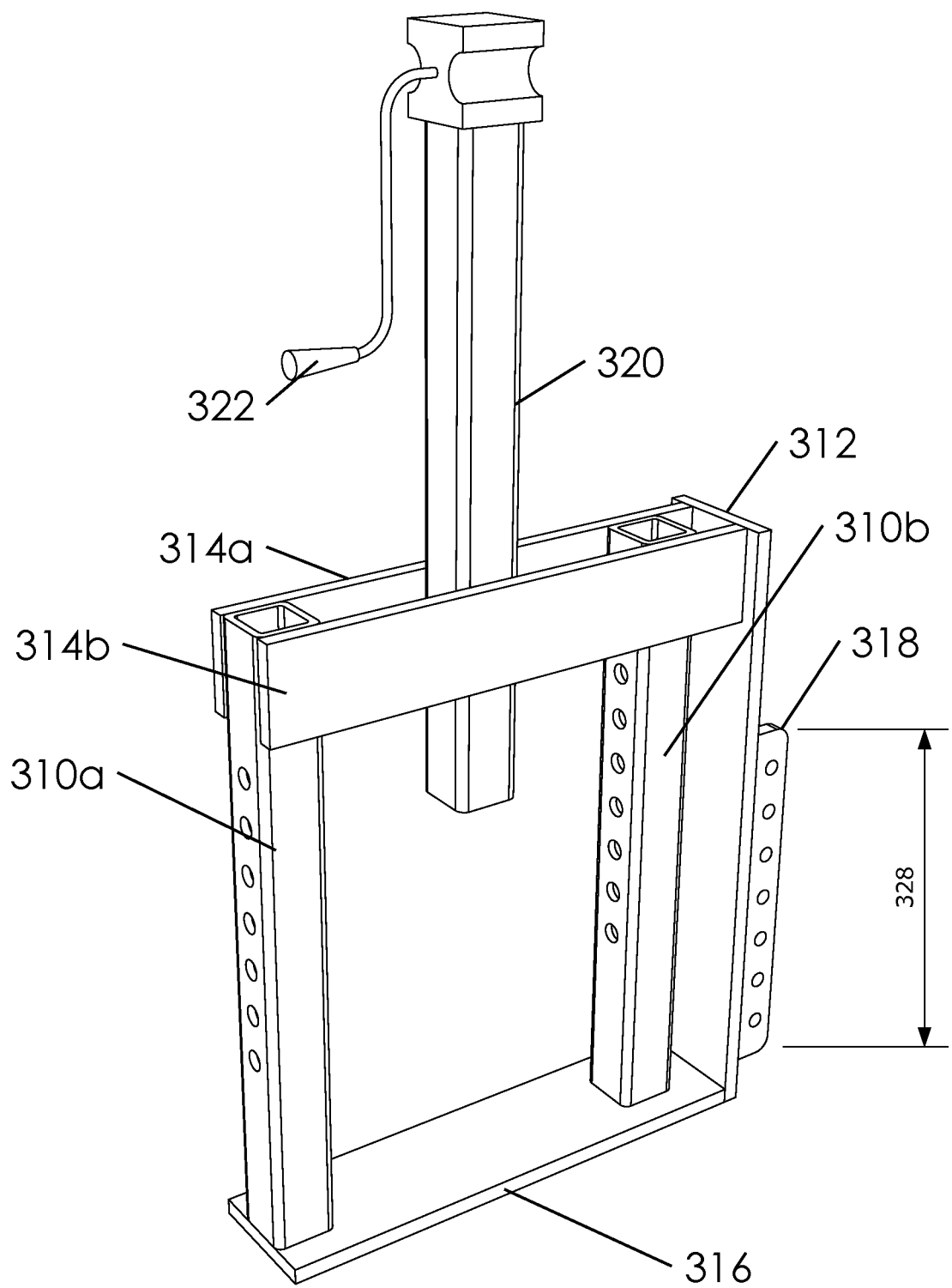
Figure 3C:
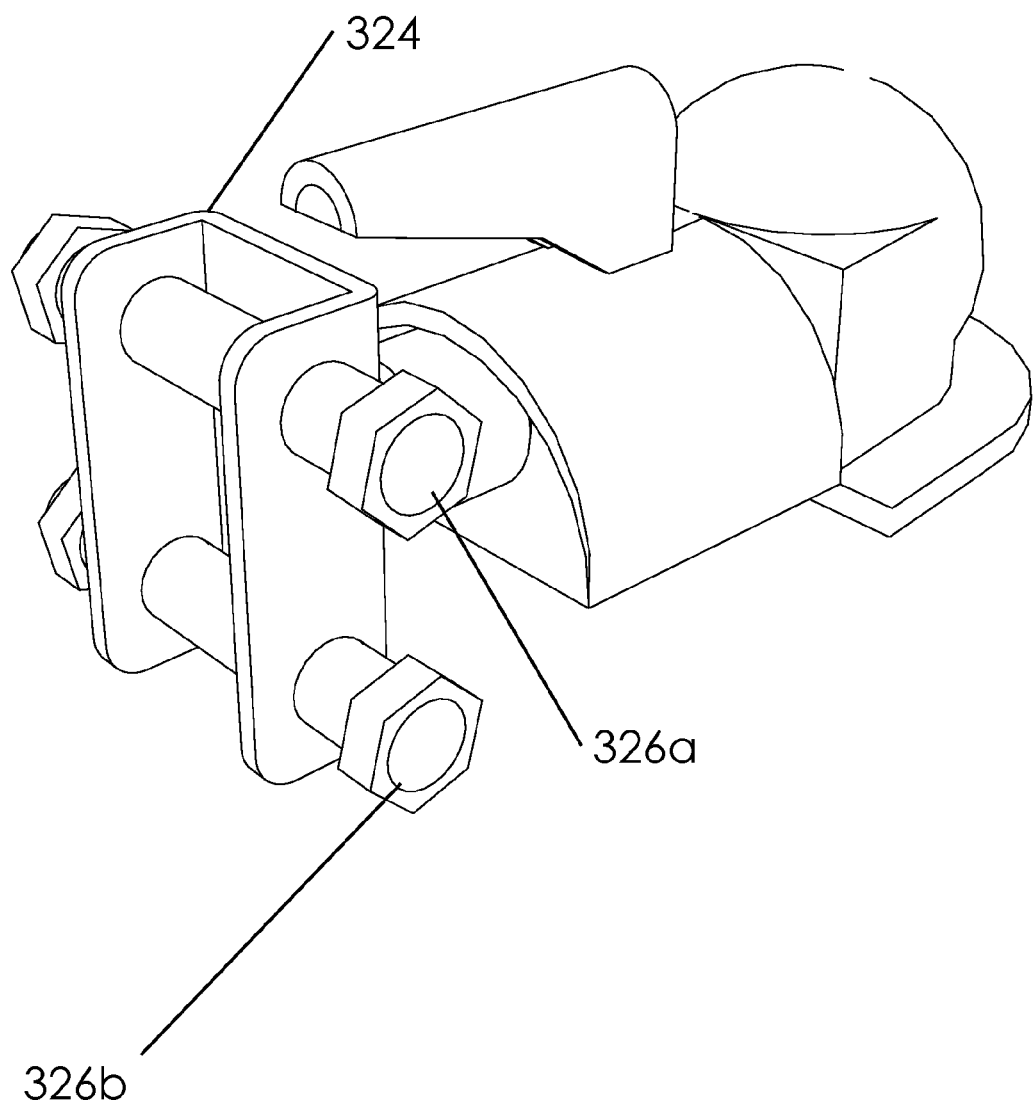

FIGS. 3A, 3B, and 3C illustrate a series of perspective overviews illustrating the portions of trailer hitch 102. FIG. 3A illustrates a perspective overview of said first bracket assembly 202. FIG. 3B illustrates a perspective overview of said second bracket assembly 204. FIG. 3C illustrates a perspective overview of said coupler assembly 206. In one embodiment, said first bracket assembly 202 can comprise a horizontal member 302. In one embodiment, said horizontal member 302 can comprise one or more vertical sleeves. In one embodiment, said one or more sleeves can comprise a first sleeve 304a and a second sleeve 304b. In one embodiment, said one or more sleeves can slide around a one or more rails of said second bracket assembly 204. Thus, in one embodiment, first bracket assembly 202 can slide along a path defined by said one or more rails of said second bracket assembly 204. In one embodiment, said one or more sleeves can comprise one or more set bolt assemblies. In one embodiment, said one or more set bolt assemblies can comprise a first set bolt assembly 306a and a second set bolt assembly 306b. In one embodiment, said one or more set bolt assemblies can hold said first bracket assembly 202 in a position on said one or more rails by releasably attaching said one or more sleeves to said one or more rails.

In one embodiment, said horizontal member 302 can be attached to a vehicle trailer (such as a boat trailer, a horse trailer, a cargo trailer, or similar) or can be an integral part of said vehicle trailer. In one embodiment, said trailer hitch 102 can be attached to said vehicle trailer with an adapter. In one embodiment, said trailer hitch 102 can attach to said vehicle trailer at said end portion 210.

In one embodiment, said second bracket assembly 204 can comprise said one or more rails. In one embodiment, said one or more rails can comprise a first rail 310a and a second rail 310b. Said second bracket assembly 204 can comprise a frame capable of holding said one or more rails. In one embodiment, said frame can comprise a vertical plate 312, a first top plate 314a, a second top plate 314b, and a bottom plate 316. In one embodiment, said frame can comprise a "C" shape wherein said vertical plate 312 can comprise a substantially vertical portion of said "C" shape; said bottom plate 316 can comprise a bottom portion of said "C" shape; and said first top plate 314a and said second top plate 314b can comprise a top portion of said "C" shape. In one embodiment, a top end of said one or more rails can be held between said first top plate 314a and said second top plate 314b; and a bottom end of said one or more rails can be attached to said bottom plate 316.

In one embodiment, said coupler assembly 206 can attach to said second bracket assembly 204. In one embodiment, said coupler assembly 206 can attach to an exterior portion of said vertical plate 312. In one embodiment, said coupler assembly 206 can comprise an adjustable trailer hitch coupler comprising a bracket 318 and a coupler 324. In one embodiment, said coupler 324 can attach to said bracket 318 at a range of positions; wherein, a vertical height 328 of said coupler 324 can be adjusted along said bracket 318. In one embodiment, said range of positions on said bracket 318 can be demarcated by a plurality of sockets capable of receiving bolt assemblies 326a and 326b capable of holding said coupler 324 to said bracket 318.

In one embodiment, said first bracket assembly 202 and said second bracket assembly 204 can comprise a jack assembly 208. In one embodiment, said jack assembly 208 can comprise an external sleeve 320, an internal sleeve 308, and a jack arm 322. In one embodiment, said internal sleeve 308 can attach to a portion of said horizontal member 302. In one embodiment, a substantially vertical position of said external sleeve 320 relative to said internal sleeve 308 can be adjusted by turning said jack arm 322, as is common in the art.

In one embodiment, a vertical position of said one or more sleeves relative to said one or more rails can be adjusted by rotating said jack arm 322. In one embodiment, the vertical position of a vehicle trailer to a vehicle can be adjusted without removing said trailer (having said trailer hitch 102) from said vehicle.

Figure 4A:
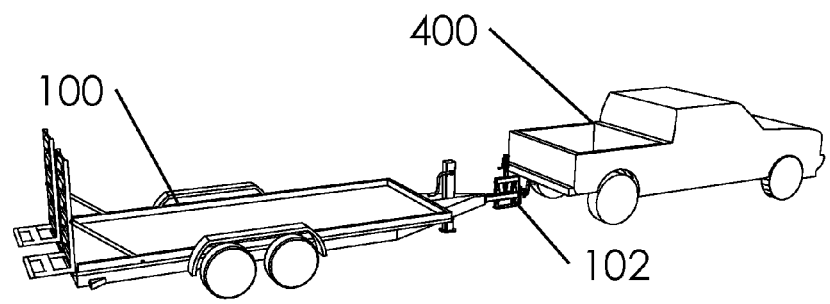
FIGS. 4A and 4B illustrate a perspective overview and an elevated side view of said trailer comprising said trailer hitch attached to vehicle.
Figure 4B:
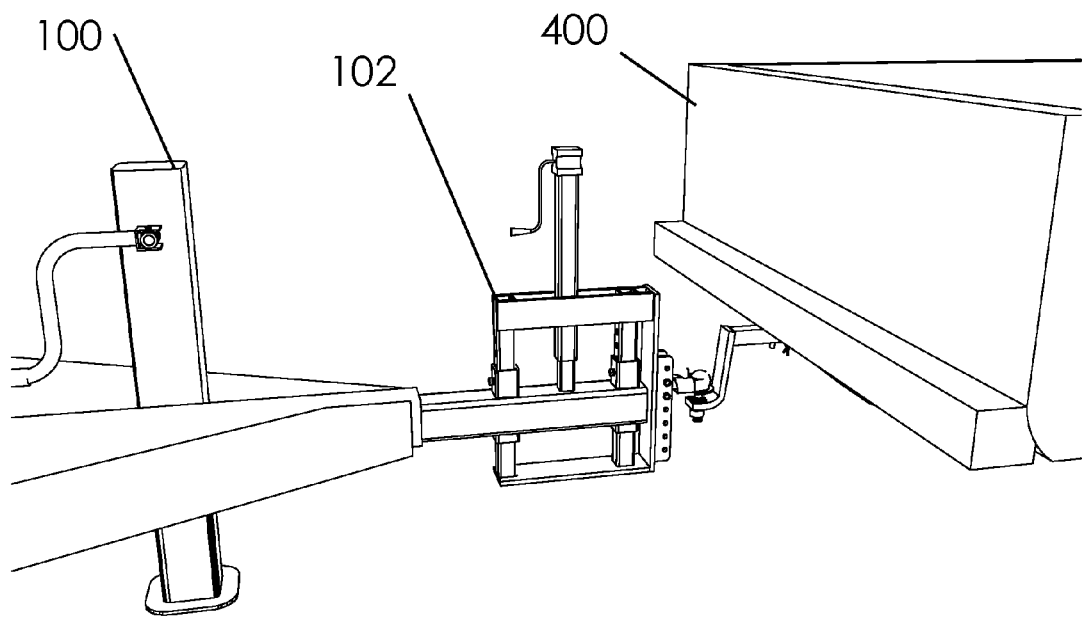
Figure 5A:
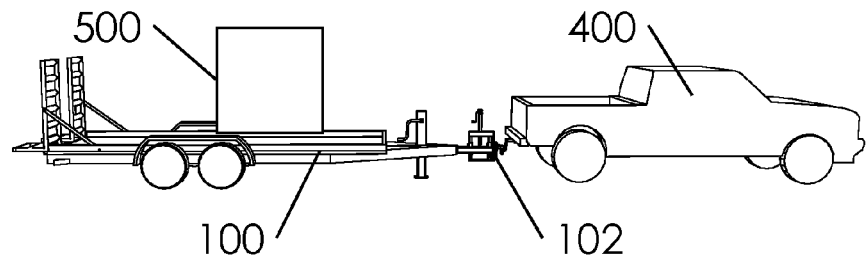
FIGS. 5A, 5B, 5C, and 5D illustrate a series of views illustrating a method of adjusting said trailer hitch based on load.
Figure 5B:
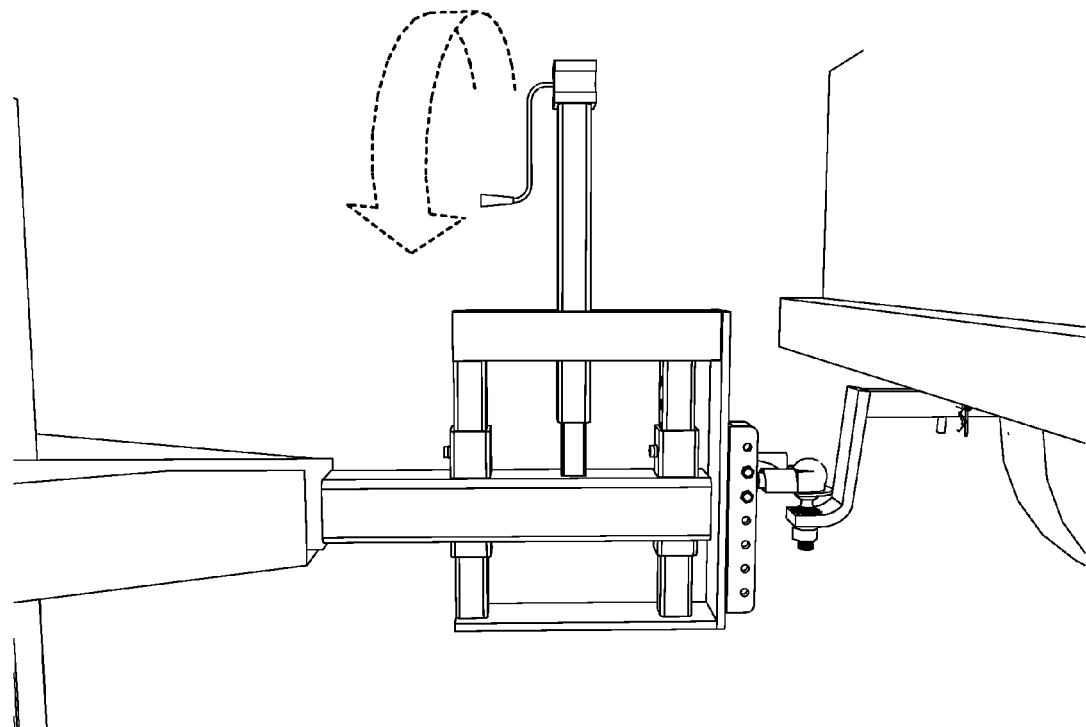
Figure 5C:
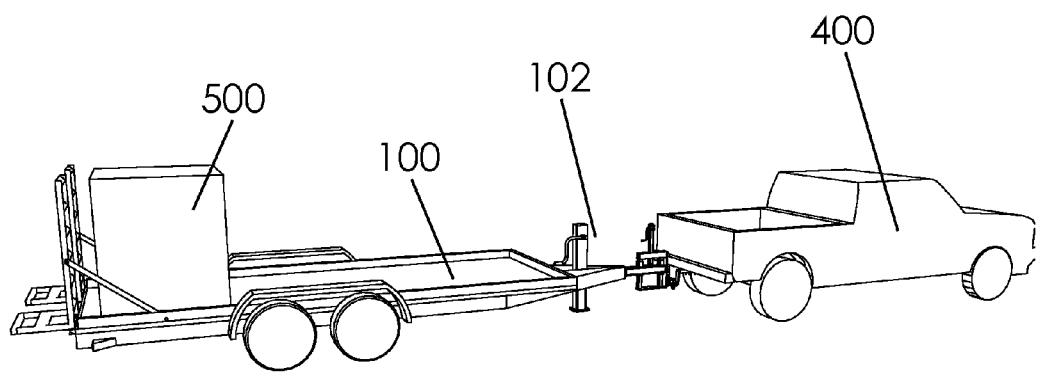
Figure 5D:
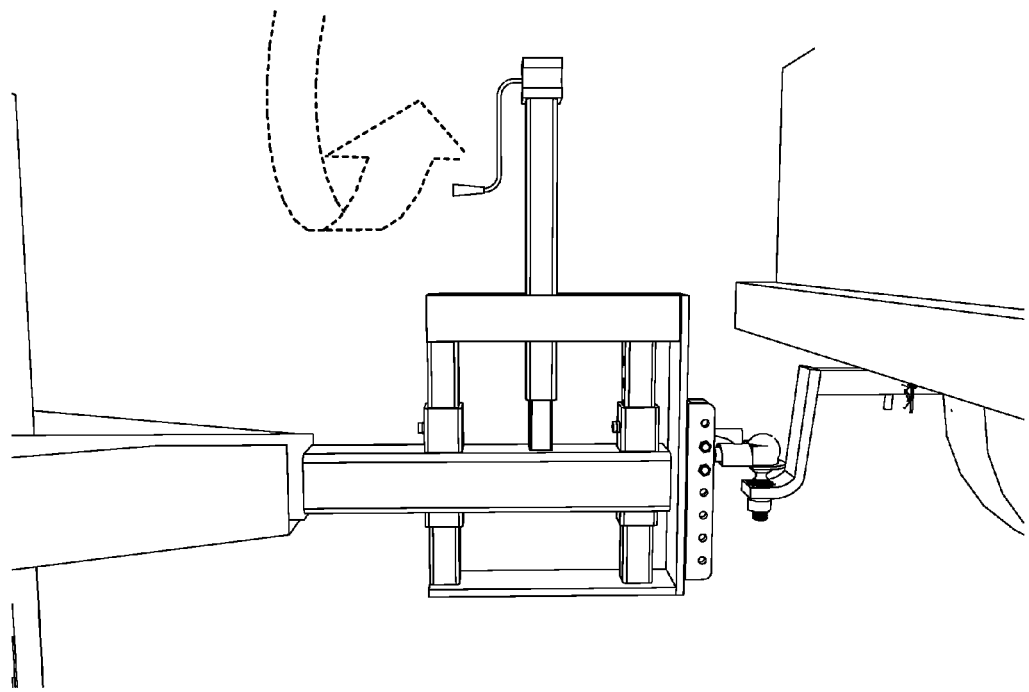

FIGS. 4A and 4B illustrate a perspective overview and an elevated side view of said trailer 100 comprising said trailer hitch 102 attached to a vehicle 400. In one embodiment, said vehicle 400 can comprise a truck, tractor, or other similar purpose vehicle that can be used for pulling or towing said trailer 100.

FIGS. 5A, 5B, 5C, and 5D illustrate a series of views illustrating a method of adjusting said trailer hitch 102 based on a load 500. In one embodiment, said load 500 can be placed on the front half of said trailer 100 and said jack arm 322 rotated to adjust the height of said trailer hitch 102 that would maintain proper leverage. In one embodiment, said load 500 can be placed on the back half of said trailer 100 and said jack arm 322 rotated to adjust the height of said trailer hitch 102 that would maintain proper leverage. In one embodiment, said load 500 can be shifted and said trailer hitch 102 can be adjusted while still attached to said vehicle 400 to compensate.

Figure 6:
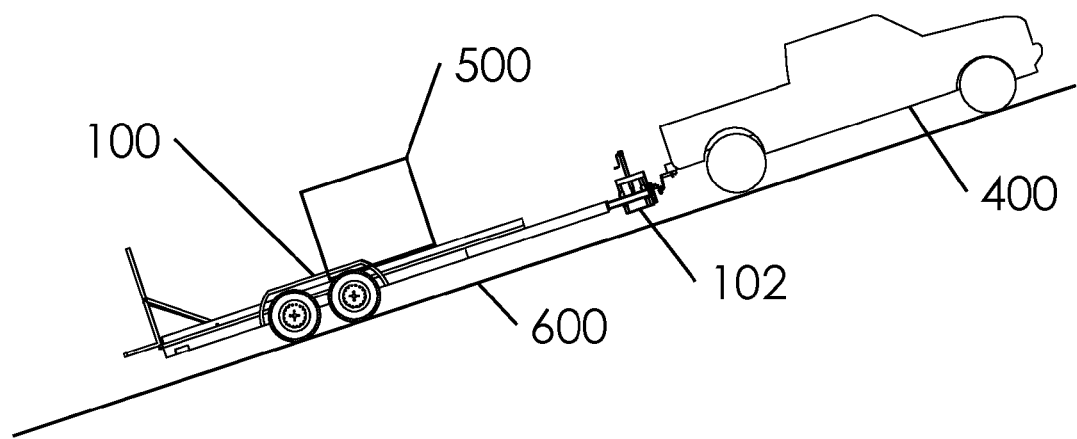
FIG. 6 illustrates a perspective side view of said load on said trailer while attached to said vehicle while traveling on a slope.

FIG. 6 illustrates a perspective side view of said load 500 on said trailer 100 while attached to said vehicle 400 while traveling on a slope 600. In one embodiment, trailer hitch 102 can be adjusted to maintain proper leverage while traveling on said slope 600. In one embodiment, said trailer hitch 102 can be adjusted while still attached to vehicle 400 while said trailer 100 and said vehicle 400 are on said slope 600.

Figure 7:
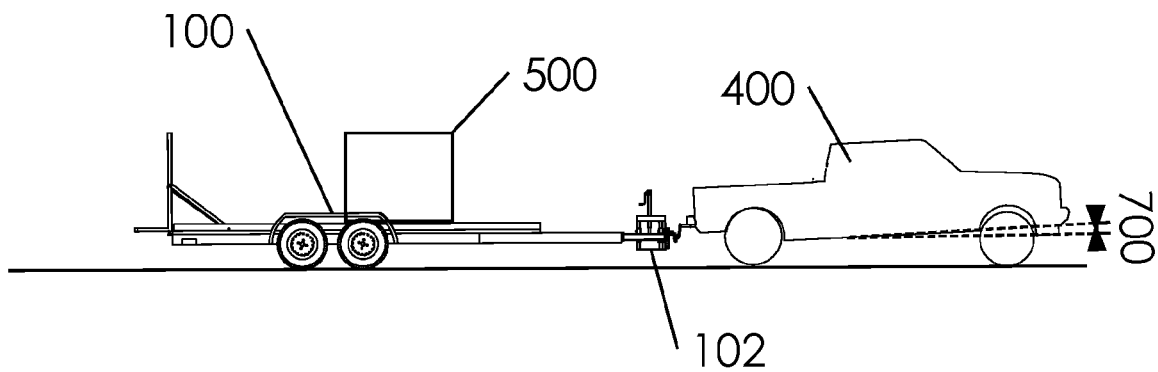
FIG. 7 illustrates a perspective side view of said load on said trailer causing said vehicle to ride at an angle.

FIG. 7 illustrates a perspective side view of said load 500 on said trailer 100 causing said vehicle 400 to ride at an angle 700. In one embodiment, said trailer 100 can stay level by adjusting said trailer hitch 102 despite the reverse rake of said vehicle 400. In one embodiment, said angle 700 can vary depending on said load 500 on said trailer 100. In one embodiment, said trailer hitch 102 permits adaptive adjustment of said trailer 100 leverage in response to any addition, removal, or shifting of said load 500.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A trailer hitch comprising:
   a first bracket assembly,
   a second bracket assembly, and
   a coupler assembly;
   said first bracket assembly adjustably attaches to said second bracket assembly;
   said first bracket assembly moves in a substantially vertical direction relative to said second bracket assembly;
   said coupler assembly attaches to said second bracket assembly;
   said coupler assembly releasably attaches to a hitch on a vehicle;
   a jack assembly capable of mechanically adjusting said first bracket assembly in a vertical direction relative to said second bracket assembly;
   said first bracket assembly comprises a one or more horizontal portions and a one or more vertical portions;
   said second bracket assembly comprises a one or more horizontal portions and a one or more vertical portions;
   said one or more vertical portions of said first bracket assembly are capable of slidably attaching to said one or more vertical portions of said second bracket assembly;
   said one or more vertical portions of second bracket assembly slidably attaches to said first bracket assembly as a guide;
   said one or more vertical portions of second bracket assembly are supported by a horizontal top component, a one or more vertical components, and a horizontal bottom component; and
   said horizontal top component attaches to said jack assembly.

2. The trailer hitch of claim 1 wherein:
   said jack assembly comprises a first portion, a second portion, and a crank assembly;
   said first portion attaches to said first bracket assembly;
   said second portion attaches to said second bracket assembly; and
   said crank assembly is capable of moving said first portion of said jack assembly relative to said second portion of said jack assembly.

3. The trailer hitch of claim 2 wherein:
said crank assembly adjusts a screw thread portion of said jack assembly, and
said screw thread portion adjusts said first portion of said jack assembly relative to said second portion of said jack assembly.

4. The trailer hitch of claim 1 wherein:
said one or more horizontal portions of said first bracket assembly attaches to a portion of said trailer.

5. A method of using a trailer hitch comprising:
adjustably attaching a first bracket assembly to a second bracket assembly,
moving said first bracket assembly in a vertical direction relative to said second bracket assembly, and
releasably attaching a coupler assembly to a hitch on a vehicle; wherein,
   said trailer hitch comprises said first bracket assembly, said second bracket assembly and said coupler assembly,
   said coupler assembly attaches to said second bracket assembly;
   a jack assembly capable of mechanically adjusting said first bracket assembly in a vertical direction relative to said second bracket assembly;
   said first bracket assembly comprises one or more horizontal portions and one or more vertical portions;
   said second bracket assembly comprises one or more horizontal portions and one or more vertical portions;
   said one or more vertical portions of said first bracket assembly are capable of slidably attaching to said one or more vertical portions of said second bracket assembly;
   said one or more vertical portions of second bracket assembly slidably attaches to first bracket assembly as a guide;
   said one or more vertical portions of second bracket assembly are supported by a horizontal top component, one or more vertical components, and a horizontal bottom component; and
   said horizontal top component attaches to said jack assembly.

6. The method of claim 5 further comprising:
placing a load on the front half of said trailer,
adjusting said first bracket assembly higher relative to second bracket assembly, and
maintaining balanced load leverage on said coupler assembly.

7. The method of claim 5 further comprising:
placing a load on the back half of said trailer,
adjusting said first bracket assembly lower relative to second bracket assembly, and
maintaining balanced load leverage on said coupler assembly.

8. The method of claim 5 further comprising:
placing a load on said trailer,
shifting said load on said trailer,
leaving the trailer attached to a vehicle,
performing adjustments on first bracket assembly height relative to second bracket assembly, and
balancing said load on coupler assembly.

9. The method of claim 5 wherein:
placing a load on said trailer,
operating said trailer on a slope,
adjusting said first bracket assembly relative to said second bracket assembly, and
maintaining proper leverage on said coupler assembly.

10. A trailer hitch comprising:
a first bracket assembly, a second bracket assembly, and a coupler assembly;
said first bracket assembly adjustably attaches to said second bracket assembly;
said first bracket assembly moves in a substantially vertical direction relative to said second bracket assembly;
said coupler assembly attaches to said second bracket assembly;
said coupler assembly releasably attaches to a hitch on a vehicle;
said coupler assembly comprises a bracket portion and a coupler portion;
said bracket portion attaches to said second bracket assembly; and
said coupler portion can releasably attach to said bracket portion at a plurality of vertical positions.

11. A trailer hitch comprising:
a first bracket assembly, a second bracket assembly, and a coupler assembly;
said first bracket assembly adjustably attaches to said second bracket assembly;
said first bracket assembly moves in a substantially vertical direction relative to said second bracket assembly;
said coupler assembly attaches to said second bracket assembly;
said coupler assembly releasably attaches to a hitch on a vehicle;
a jack assembly capable of mechanically adjusting said first bracket assembly in a vertical direction relative to said second bracket assembly;
said first bracket assembly comprises a one or more horizontal portions and a one or more vertical portions;
said second bracket assembly comprises a one or more horizontal portions and a one or more vertical portions;
said one or more vertical portions of said first bracket assembly are capable of slidably attaching to said one or more vertical portions of said second bracket assembly;
said one or more horizontal portions of said first bracket assembly comprises a portion of said trailer; and
said jack assembly attaches to said one or more horizontal portions of said first bracket assembly.

12. A trailer hitch comprising:
a first bracket assembly, a second bracket assembly, and a coupler assembly;
said first bracket assembly adjustably attaches to said second bracket assembly;
said first bracket assembly moves in a substantially vertical direction relative to said second bracket assembly;
said coupler assembly attaches to said second bracket assembly;
said coupler assembly releasably attaches to a hitch on a vehicle;
a jack assembly capable of mechanically adjusting said first bracket assembly in a vertical direction relative to said second bracket assembly;
said first bracket assembly is capable of securely fixating at a one or more vertical positions on said second bracket assembly;
said first bracket assembly contains a plurality of sockets;
said second bracket assembly contains a plurality of sockets;
said sockets align at said one or more vertical positions;
said sockets are capable of receiving a bolt assembly when aligned; and
said bolt assembly securely fixates said first bracket assembly relative to said second bracket assembly.

* * * * *